Patented Nov. 14, 1933

1,935,434

UNITED STATES PATENT OFFICE 1,935,434

CEMENTING COMPOSITION

Abraham Cohen, Schenectady, N. Y., assignor to General Electric Company, a corporation of New York No Drawing. Application October 24, 1930
Serial No. 491,091

1 Claim. (Cl. 87—17)

My invention relates to the manufacture of laminated material, as for example, layers of wood and cloth used alternately or separately and bound together by a cementing composition, which material may be used as a substitute for fibre material in the manufacture of gears, clamps, bushings, drop hammer boards, supports and the like.

The principal object of my invention is to provide a cementing composition which shall be an effective binder capable of retaining its mechanical strength, water proof, heat resistant and durable, and it is a further object of my invention to provide a laminated material, the laminations of which are cemented or bound together with such a cementing composition.

My improved cement is composed of blood albumin, formaldehyde, ammonia, black oxide of manganese and cobalt oxide. In carrying my invention into practice the cementing composition may be prepared as follows, it being understood that the proportions given may be varied and are merely illustrative but have been found to be satisfactory: Thirty pounds of blood albumin are dissolved in fifty pounds of cold water. One pound of black oxide of manganese is stirred up in one pound of cold water and twelve ounces of cobalt oxide is stirred up in twelve ounces of cold water. The solutions, or suspensions, of each of these substances, as the case may be, are then thoroughly mixed with a pint of formaldehyde and a pint of ammonia. This mixture thoroughly stirred is then ready for use.

The solution may be applied with a brush, spreader spray or other suitable means to layers of wood, cloth, paper, etc. which are to be cemented together. After application, the parts to be united are allowed to dry. When dry, they are subjected to heat and pressure, which may vary according to the character of the laminæ used. I prefer to use a temperature of about 140° C. and a pressure of from 400 to 500 pounds per square inch for about 1¼ hours on a mass of layers approximately ¾ inch thick. Materials made up in this way and having this cement as a binder have been subjected to very strenuous service without breaking down. For example, the life of drop hammer boards (friction bearing devices) made from laminations of wood cemented with the cementing composition of my invention has been doubled.

The addition of cobalt oxide to the cement is important. It is found that the addition of the cobalt oxide causes the firm adhesion of the laminæ, makes the material water proof and capable of withstanding heat. It is also found that the cobalt oxide makes the material very hard. By varying the proportions of cobalt oxide, the cemented laminated material may be varied from a flexible to a very hard material. The greater the proportion of cobalt oxide added the harder the material will be. I have found that in place of cobalt oxide I may employ also uranium oxide or chromium oxide. However, I prefer to use cobalt oxide.

The oxide of manganese may, if desired, be omitted, but I have found that its use imparts added adhesion to the laminations and I therefore prefer to use it in my cementing composition. In place of the blood albumin I may employ any similar material having the same adhesive characteristics, as for example, various cements, glues, etc.

What I claim as new and desire to secure by Letters Patent of the United States, is,—

A cementing composition comprising blood albumin, formaldehyde, ammonia, and cobalt oxide.

ABRAHAM COHEN.